US011297673B2

(12) United States Patent
Monajemi et al.

(10) Patent No.: US 11,297,673 B2
(45) Date of Patent: Apr. 5, 2022

(54) RADIO RESOURCE MANAGEMENT USING LINE OF SIGHT FEEDBACK

(71) Applicant: Cisco Technology, Inc., San Jose, CA (US)

(72) Inventors: Pooya Monajemi, Irvine, CA (US); Santosh B. Kulkarni, Sunnyvale, CA (US); Benjamin J. Cizdziel, San Jose, CA (US); Vishal S. Desai, San Jose, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 16/812,108

(22) Filed: Mar. 6, 2020

(65) Prior Publication Data

US 2021/0282214 A1 Sep. 9, 2021

(51) Int. Cl.
| | | |
|---|---|---|
| *H04W 76/27* | (2018.01) | |
| *H04W 8/00* | (2009.01) | |
| *H04W 28/08* | (2009.01) | |
| *H04W 36/00* | (2009.01) | |
| *H04W 48/20* | (2009.01) | |
| *H04W 74/08* | (2009.01) | |
| *H04W 88/08* | (2009.01) | |
| *H04B 17/318* | (2015.01) | |

(52) U.S. Cl.
CPC ........... *H04W 76/27* (2018.02); *H04W 8/005* (2013.01); *H04W 28/08* (2013.01); *H04W 36/0094* (2013.01); *H04W 48/20* (2013.01); *H04W 74/085* (2013.01); *H04W 88/085* (2013.01); *H04B 17/318* (2015.01)

(58) Field of Classification Search
CPC ............... H04W 76/27; H04W 74/085; H04W 36/0094; H04W 88/085; H04W 8/005; H04W 48/20; H04W 28/08; H04B 17/318
See application file for complete search history.

(56) References Cited

U.S. PATENT DOCUMENTS

| | | |
|---|---|---|
| 8,824,311 B2 | 9/2014 | Beaudin |
| 9,723,510 B1 | 8/2017 | Beluri et al. |
| 9,973,943 B2 | 5/2018 | Lysejko et al. |
| 10,306,524 B2 | 5/2019 | Axmon et al. |

(Continued)

FOREIGN PATENT DOCUMENTS

| | | |
|---|---|---|
| GB | 2445385 A | 7/2008 |
| KR | 20180028668 A | 3/2018 |

OTHER PUBLICATIONS

Radio Resource Management White Paper, Author: Cisco, Jun. 24, 2016.*

(Continued)

*Primary Examiner* — Marisol Figueroa
(74) *Attorney, Agent, or Firm* — Patterson + Sherdan, LLP

(57) ABSTRACT

Techniques are disclosed for determining, at a first wireless access point (AP), one or more radio resource management (RRM) input parameters. The one or more RRM input parameters are determined based on a line of sight (LOS) estimate between two wireless stations (STAs). A plurality of RRM values are generated based on the one or more RRM input parameters. A wireless connection is established between the first AP and a first STA using the RRM values.

19 Claims, 6 Drawing Sheets

(56) References Cited

U.S. PATENT DOCUMENTS 10,541,778 B1 1/2020 Cizdziel et al.
2007/0099644 A1 5/2007 Batra et al.
2017/0367067 A1 12/2017 Hwang et al.

OTHER PUBLICATIONS

Jussi Turkka and Markku Renfors, "Path Loss Measurements for Non-Line-of-Sight Mobile-to-Mobile Enviroment," IEEE Xplore, Nov. 2008, pp. 6.
U.S. Appl. No. 16/748,582 for CISC/CPOL1017614US02 filed Jan. 21, 2020.
U.S. Appl. No. 16/542,056 for CISC/CPOL1023717US01 filed Aug. 15, 2019.
PCT, Notification of Transmittal of The International Search Report and The Written Opinion of The International Searching Authority, or the Declaration for Application PCT/US2021/070244 dated Jun. 8, 2021.

* cited by examiner

RADIO RESOURCE MANAGEMENT USING LINE OF SIGHT FEEDBACK

TECHNICAL FIELD

Embodiments presented in this disclosure generally relate to wireless communications. More specifically, one or more embodiments disclosed herein relate to radio resource management using line of sight feedback.

BACKGROUND

Radio resource management (RRM) algorithms in enterprise WiFi frequently depend on input measurements from communications between wireless Access Points (APs). For example, neighbor discovery protocol (NDP) packets can be transmitted from an AP to its neighbors. The NDP packets can assist the neighboring APs in discovering the existence of the source AP, and can be used to measure radio frequency (RF) path-loss among the APs.

Newer WiFi standards (e.g., 802.11k) include additional client-side measurement feedback. For example, clients can now report to associated APs information about nearby additional APs that are visible to this client. This information, along with the AP-to-AP communication, can be used for RRM management and optimization.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
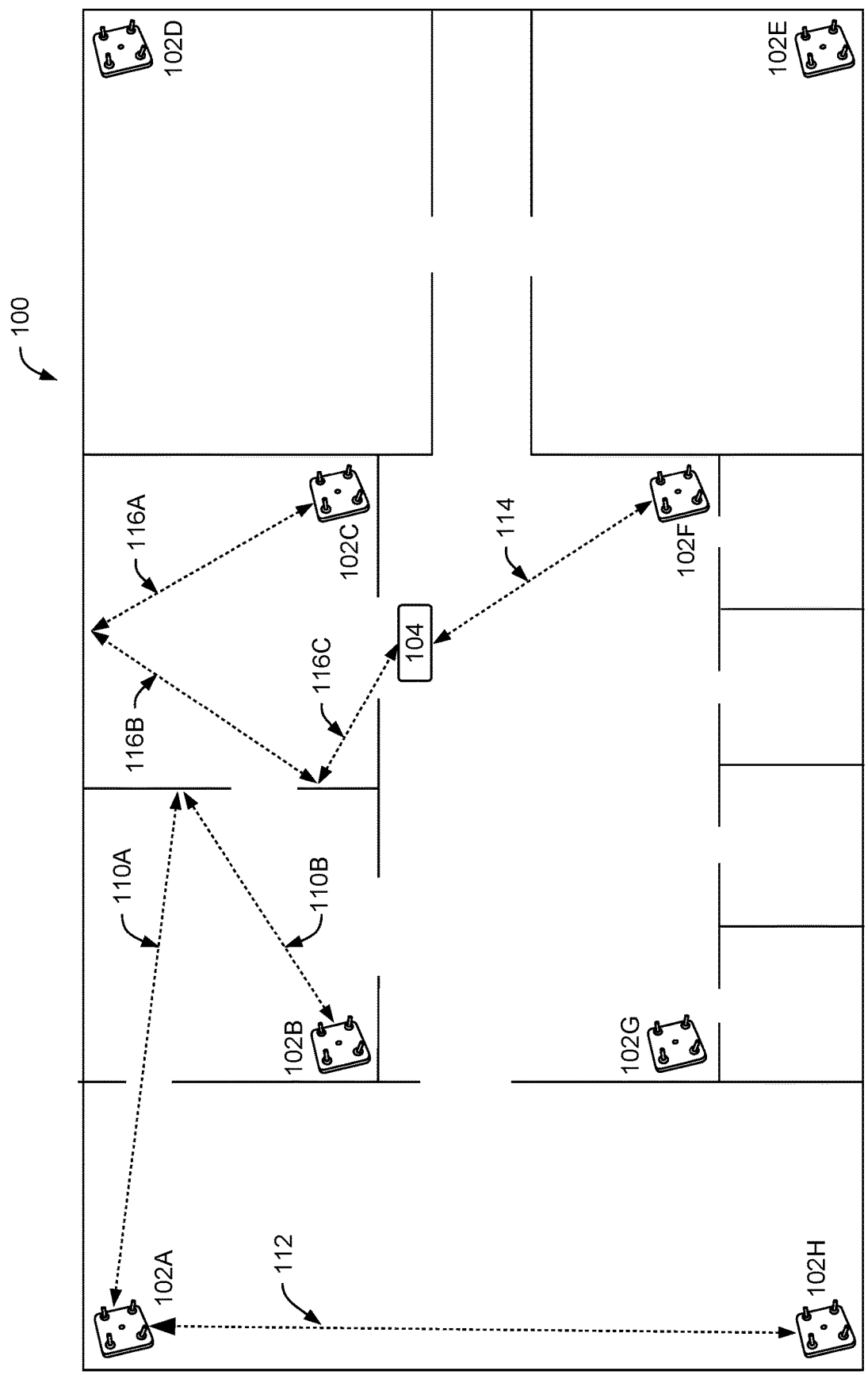
FIG. 1 illustrates determining a range and line of sight between wireless STAs, according to one embodiment.

Embodiments include a method. The method includes determining, at a first wireless access point (AP), one or more radio resource management (RRM) input parameters, wherein the one or more RRM input parameters are determined based on a line of sight (LOS) estimate between two wireless stations (STAs). The method further includes generating a plurality of RRM values based on the one or more RRM input parameters. The method further includes establishing a wireless connection between the first AP and a first STA using the RRM values.

Embodiments further include a first wireless AP, including a processor and a memory storing a program, which, when executed on the processor, performs an operation. The operation includes determining, at the AP, one or more RRM input parameters, wherein the one or more RRM input parameters are determined based on a LOS estimate between two STAs. The operation further includes generating a plurality of RRM values based on the one or more RRM input parameters. The operation further includes establishing a wireless connection between the AP and a first STA using the RRM values.

Embodiments further include a non-transitory computer program product including a computer-readable storage medium having computer-readable program code embodied therewith, the computer-readable program code executable by one or more computer processors to perform an operation. The operation includes determining, at the AP, one or more RRM input parameters, wherein the one or more RRM input parameters are determined based on a LOS estimate between two STAs. The operation further includes generating a plurality of RRM values based on the one or more RRM input parameters. The operation further includes establishing a wireless connection between the AP and a first STA using the RRM values.

Example Embodiments

As discussed above, in an embodiment, APs can use client-side measurement feedback and AP to AP communication for RRM management and optimization. Currently, neither the client-side measurement feedback nor the AP to AP communication includes information about location and whether or not there is a clear line of sight between the reporting device and the receiving device.

More recently, however, proposed WiFi specifications include reporting of the likelihood that a ranging measurement between wireless stations (STAs) has been performed in line of sight (LOS). For example, a draft specification for the IEEE 802.11az specification includes a field to report this likelihood of LOS for a recent ranging measurement.

In an embodiment, LOS information can be used to improve RRM management and optimization (e.g., by an AP). In this embodiment, as discussed further with regard to the subsequent figures, by incorporating LOS information, RRM can better determine how much overlap actually exists between two AP's coverage areas, instead of solely relying on AP to AP signal strength. For example, transmissions from one AP to two neighboring APs may each have the same signal strength, but one neighboring AP may be physically closer to the source AP but not in LOS, while the other AP may be physically more distant from the source AP while in LOS. The closer AP is more likely to overlap in coverage area with the source AP, because it is physically closer.

Thus, the source AP can take into account the LOS information to improve RRM and avoid overlap and radio transmission conflicts (e.g., interference). In an embodiment, several different types of measurements can be used. For example, inter-AP measurements (i.e., AP to AP) can be used, and can include both fine timing measurement (FTM) ranging performed among nearby APs, as well as NDP transmission and reception. The ranging may be added to the current off-channel procedures.

As another example, client to AP measurements can also be used, including FTM ranging, as well as beacon reports. In this example, a client may perform ranging with many nearby APs in a rapid sequence in an attempt to locate itself. When a client is found with high LOS likelihood to the associated AP as well as at least one nearby AP, the AP can request a beacon report from the client. Client reports with higher LOS likelihood can be assigned a higher reliability weight than those with lower LOS likelihood. The data can then be collected and stored (e.g., in a database at the AP or accessible to the AP) to be used in RRM as well as roaming.

Further, as discussed below, in an embodiment LOS estimate information can be used for at least three aspects of RRM. First, it can be used for LOS verification (e.g., to verify the LOS likelihood estimate). Second, it can be used for channel and transmission power assignment. Third, it can be used for roaming management. These are merely examples, and LOS estimate information can be used in any suitable aspect of RRM.

FIG. 1 illustrates determining a range and LOS between wireless STAs, according to one embodiment. An indoor environment 100 includes a number of STAs, including APs 102A-H and a user device 104. The user device 104 can be any suitable user device, including a smartphone, a tablet, a laptop computer, or another suitable device. Each of the STAs (e.g., the APs 102A-H and user device 104) can estimate a range with other STAs, in a variety of ways. For example, the STAs can use signal strength (e.g., a Received Signal Strength Indicator (RSSI)) for received transmissions received from other STAs.

As another example, the STAs can use round trip measurements (e.g., FTM or other suitable techniques) to estimate the time taken for wireless signals to travel between STAs. Because the distance is proportional to the travel time (e.g., based on the speed of light) these round trip time measurements can be used to estimate the range between the STAs.

In an embodiment, this can be done for STAs with LOS to each other, and for STAs without LOS. For example, the AP 102A has LOS with the AP 102H using the path 112. The AP 102A can also communicate with the AP 102B, but it does not have LOS: a signal from the AP 102A to the AP 102B must either reflect (e.g., along paths 110A and 110B) or transmit through the blocking medium.

Similarly, the user device 104 has LOS to the AP 102F along the path 114. The user device 104 can also communicate with the AP 102C, but it does not have LOS. The communication must either transmit through the blocking medium or reflect. For example, communication between the user device 104 and the AP 102C can follow the reflective path 116A to 116B to 116C.

Figure 2:
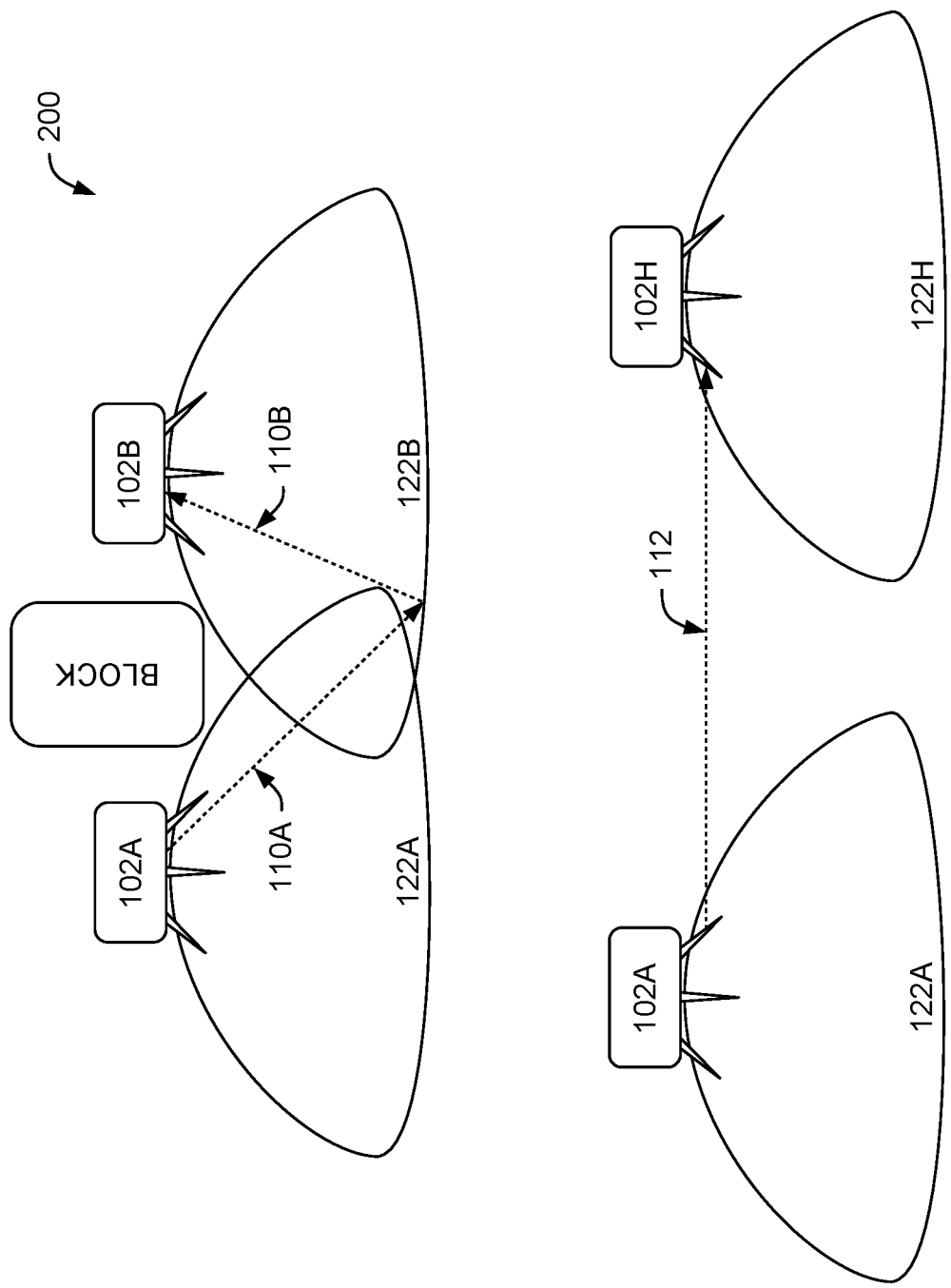
FIG. 2 illustrates line of sight transmission between wireless APs, according to one embodiment.

FIG. 2 illustrates LOS transmission between wireless APs, according to one embodiment. An environment 200 (e.g., an indoor environment) includes APs 102A, 102B, and 102H. The APs 102A and 102B are located close to each physically, but do not have LOS because of a block located between them. Assuming the block allows little, or no, signal transmission, a signal between the AP 102A and the AP 102B must travel a reflective path, for example 110A to 110B. The APs 102A and 102H have a LOS path, but are located further apart physically. A signal between the AP 102A and the AP 102H may travel a direct path 112.

The AP 102A has a coverage area 122A. The AP 102B has a coverage area 122B. The AP 102H has a coverage area 122H. Because the AP 102A is located in close physical proximity to the AP 102B, the coverage area 122A overlaps with the coverage area 122B, even though the AP 102A and the AP 102B do not have a direct LOS for communication. The AP 102A is located further from the AP 102H, and therefore the coverage area 122A does not overlap with the coverage area 122H.

Assume that the measured path-loss for communication between the AP 102A and the AP 102B (e.g., along the path 110A to 110B) is the same as the measured path-loss for communication between the AP 102A and the AP 102H. This could be, for example, because the AP 102A is closer to the AP 102B than the AP 102H, but the lack of LOS between the AP 102A and the AP 102B results in more path loss per distance traveled.

An AP undertaking RRM management (e.g., the AP 102A) could assume that the same RRM values should apply to each scenario. But this may result in suboptimal results. The coverage area 122A overlaps with the coverage area 122B, and so the APs 102A and 102B should take this overlap into account and use different RRM values to avoid conflict (e.g., different channels, or lower transmission powers, etc.). The coverage area 122A does not overlap with the coverage area 122H, and so the APs 102A and 102H do not have to take potential conflict into account for their RRM values. Incorporating LOS estimation into the RRM can distinguish between the situations and lessen, or eliminate, this problem.

Figure 3:
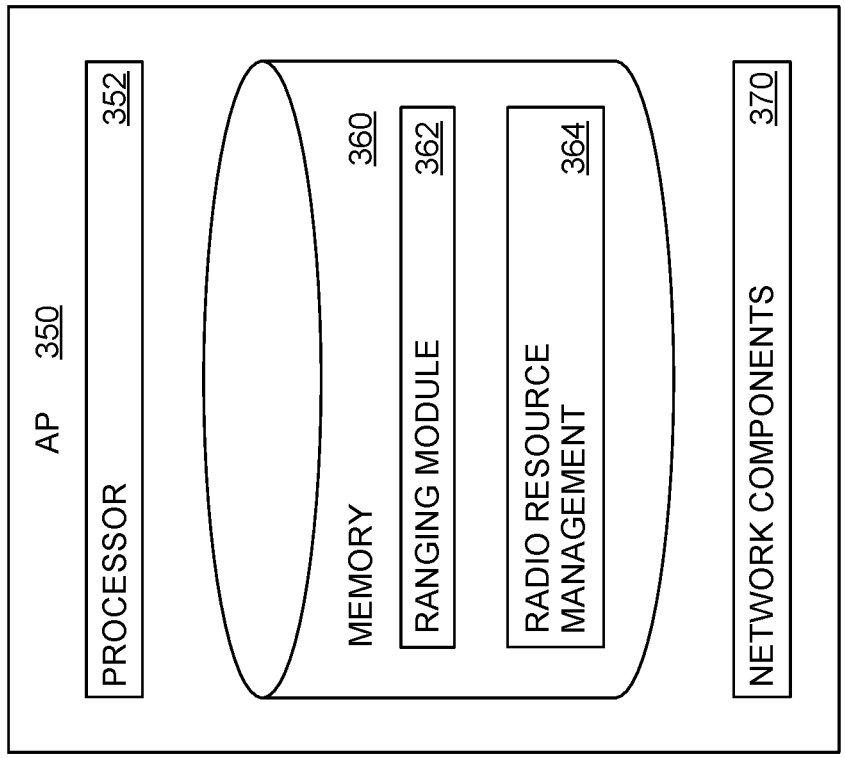
FIG. 3 is a block diagram illustrating a wireless user device and an AP, according to one embodiment.
Figure 3:
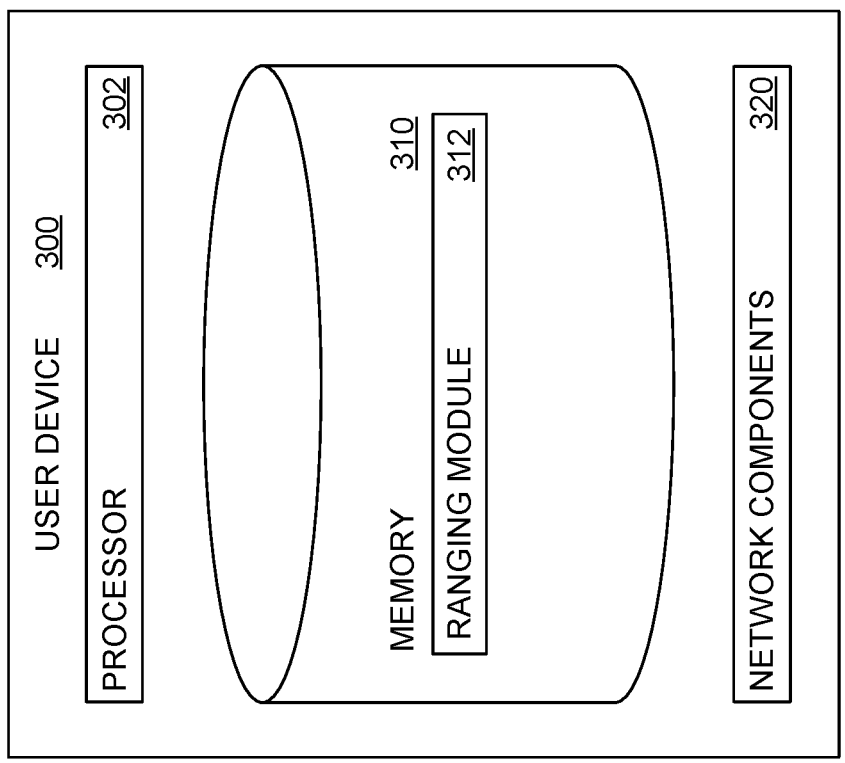

FIG. 3 is a block diagram illustrating a user device 300 and an AP 350, according to one embodiment. The user device 300 includes a processor 302, a memory 310, and network components 320. The processor 302 generally retrieves and executes programming instructions stored in the memory 310. The processor 302 is included to be representative of a single central processing unit (CPU), multiple CPUs, a single CPU having multiple processing cores, graphics processing units (GPUs) having multiple execution paths, and the like.

The network components 320 include the components necessary for the user device 300 to interface with a wireless communication network, as discussed above in relation to FIGS. 1-2. For example, the network components 320 can include WiFi or cellular network interface components and associated software.

Although the memory 310 is shown as a single entity, the memory 310 may include one or more memory devices having blocks of memory associated with physical addresses, such as random access memory (RAM), read only memory (ROM), flash memory, or other types of volatile and/or non-volatile memory. The memory 310 generally includes program code for performing various functions related to use of the user device 300. The program code is generally described as various functional "applications" or "modules" within the memory 310, although alternate implementations may have different functions and/or combinations of functions.

Within the memory 310, a ranging module 312 facilitates finding a range with another wireless device (e.g., another user device, an AP, another wireless infrastructure device, or any other suitable wireless device). In an embodiment, the ranging module 312 can generate a LOS estimate to the other wireless device. This is discussed further with regard to FIG. 4 and after.

The AP 350 includes a processor 352, a memory 360, and network components 370. The processor 352 generally retrieves and executes programming instructions stored in the memory 360. The processor 352 is included to be representative of a single central processing unit (CPU), multiple CPUs, a single CPU having multiple processing cores, graphics processing units (GPUs) having multiple execution paths, and the like.

The network components 370 include the components necessary for the AP 350 to interface with a wireless communication network, as discussed above in relation to FIGS. 1-2. For example, the network components 370 can include WiFi or cellular network interface components and associated software.

Although the memory 360 is shown as a single entity, the memory 360 may include one or more memory devices having blocks of memory associated with physical addresses, such as random access memory (RAM), read only memory (ROM), flash memory, or other types of volatile and/or non-volatile memory. The memory 360 generally includes program code for performing various functions related to use of the AP 350. The program code is generally described as various functional "applications" or "modules" within the memory 360, although alternate implementations may have different functions and/or combinations of functions.

Within the memory 360, the ranging module 362 facilitates finding a range with another wireless device (e.g., a user device, another AP, another wireless infrastructure device, or any other suitable wireless device). In an embodiment, the ranging module 362 can generate a LOS estimate to the other wireless device. The memory 360 also includes an RRM module 364. In an embodiment, the RRM module 364 manages radio resources for the AP 350. Further, in an embodiment, the RRM module 364 can use a LOS estimate generated by the ranging module 362 for RRM for the AP 350. This is discussed further with regard to FIG. 4 and after.

Further, while the RRM module 364 is illustrated in the AP 350, it could instead (or in addition) be located in a central controller or any other suitable network component. In one embodiment, the AP acts as a central controller or includes central controller functionality. Alternatively, another network component acts as a central controller or includes central controller functionality.

Figure 4:
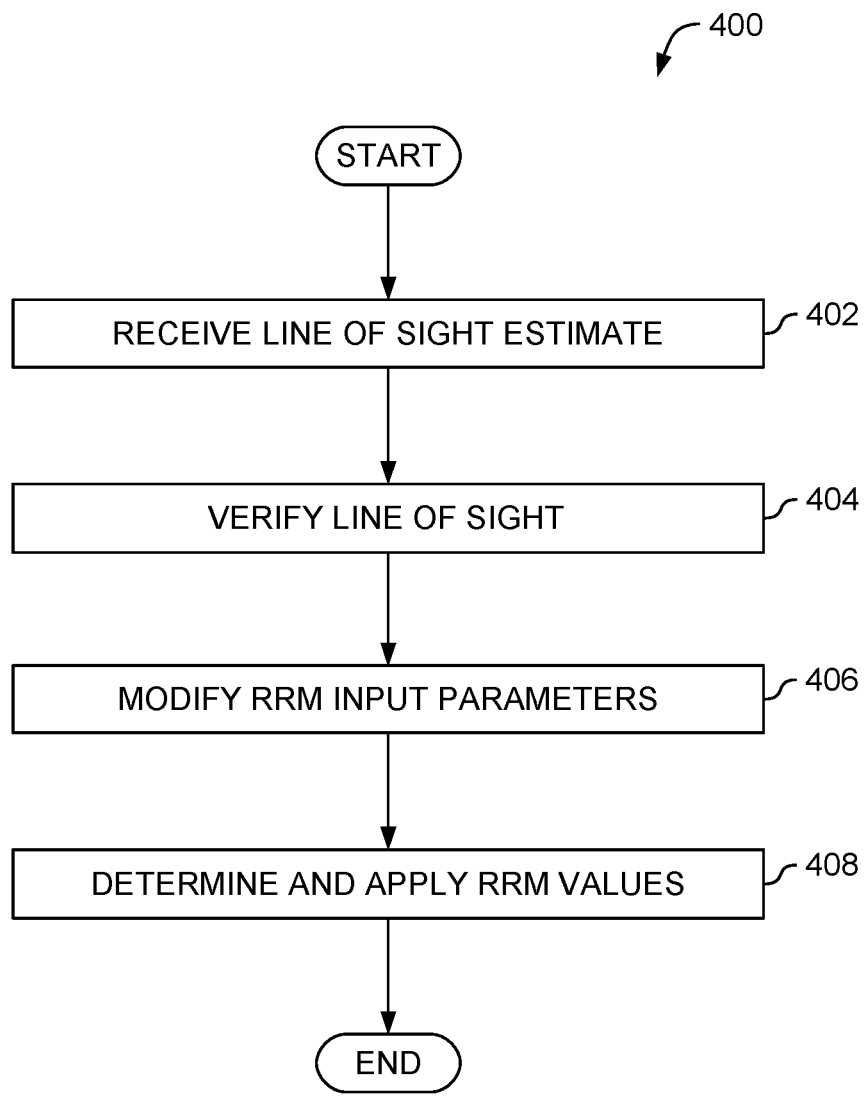
FIG. 4 is a flowchart for RRM using line of sight information, according to an embodiment.

FIG. 4 is a flowchart 400 for RRM using line of sight information, according to an embodiment. At block 402, a ranging module (e.g., ranging module 362 in the AP 350 illustrated in FIG. 3) receives a LOS estimate. As discussed above, this can be a LOS estimate for a user device (e.g., the user device 300 illustrated in FIG. 3), for another AP, or for any other suitable wireless device. Further, the user device can receive the LOS estimate (e.g., for another user device, for an AP, or for another suitable wireless device). In an embodiment, the LOS estimate can be a LOS Likelihood element included in the proposed 802.11az specification, as shown in FIG. 5.

Figure 5:
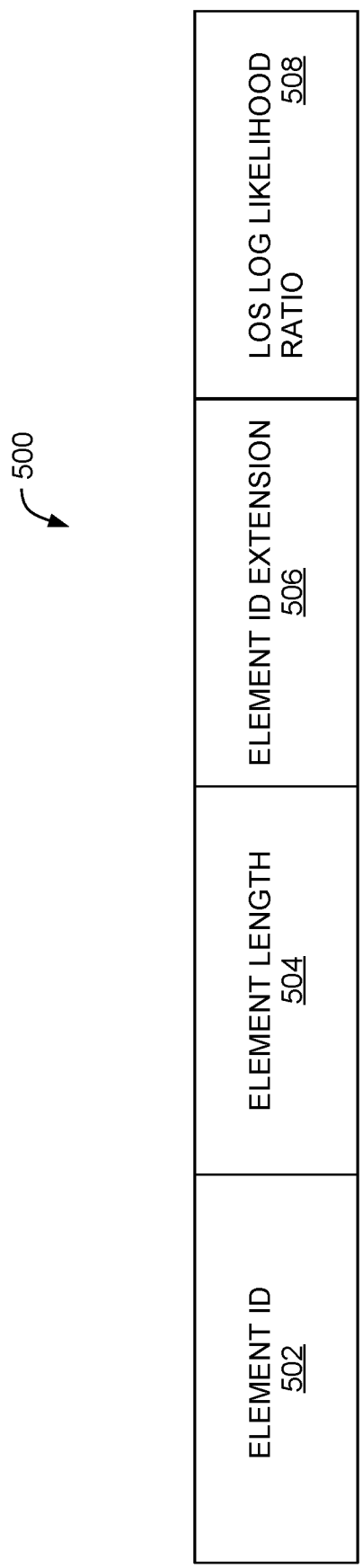
FIG. 5 illustrates a line of sight likelihood element for transmission in a network message, according to an embodiment.

FIG. 5 illustrates a LOS likelihood element 500 for transmission in a network message (e.g., as part of the 802.11az standard), according to an embodiment. In an embodiment, the LOS likelihood element includes four octets. The octet 502 includes an element ID identifying the LOS likelihood element. The octet 504 includes a length of the element (e.g., the length of the LOS likelihood element). The octet 506 includes an element ID extension.

The octet 508 includes the LOS log likelihood ratio. In an embodiment, the LOS log likelihood ratio contains the estimated log likelihood that measurements contained in a direction measurement element or in the TOD field of an FTM frame are LOS measurements. The LOS log likelihood ration field can be, for example, a signed 8-bit number containing 40×log 10 of the estimated ratio between the probability that the relevant measurement is on a LOS path and the probability that the measurement is on a non-LOS path. In an embodiment, this covers the range of −31.75 dB to +31.75 dB. This is merely an example, and the LOS log likelihood ratio can be represented in any suitable fashion. Further, the octet 508 may not include a logarithmic representation at all. In an embodiment, a predetermined value (e.g., 255) can be used in this octet 508 to indicate that the LOS log likelihood ratio is not available. The line of sight likelihood element 500 is merely one example of a data structure for a LOS estimate. Any suitable element or data structure can be used.

Returning to FIG. 4, at block 404 the ranging module verifies the received LOS. As discussed above, in an embodiment the ranging module receives a LOS estimate (e.g., included in the LOS likelihood element 500 illustrated in FIG. 5). In an embodiment, this LOS estimate can be further enhanced by comparing the distance between the wireless STAs (e.g., the STAs for which LOS is estimated) with estimated path-loss between them to vary the LOS likelihood estimate.

For example, a distance between the wireless STAs can be estimated using FTM, or any other suitable ranging technique. An estimated path-loss can be derived from existing calculation techniques, for example NDP frames communicated between STAs (e.g., between two APs). In existing systems, for example, APs can broadcast or transmit NDP frames that include the transmit power used for the NDP frame's transmission. The recipient of one of these NDP frames can derive path-loss by comparing the reported transmit power (e.g., in the NDP frame) with the RSSI of the received packet. NDP frames are merely one example of a suitable path-loss derivation technique, and other protocols or techniques (e.g., between user devices, or between a user device and an AP) can be used.

In an embodiment, for two STAs within LOS the path-loss would be expected to match a LOS path-loss model (e.g., free space path-loss). If the computed path-loss is significantly higher than would be expected given the LOS path-loss model, then it is likely that the STAs are not within LOS. Assuming the LOS estimate suggests, inaccurately, that the STAs are within LOS, a trust level in the report's LOS information can be reduced or lowered. Alternatively, or in addition, the LOS estimate itself can be modified to correct the incorrect estimate. Further, in an embodiment, an AP with directional antennas can adjust the path-loss model to account for antennal pattern gains (e.g., using antenna information available to a ranging module operating on an AP).

At block 406, an RRM module (e.g., the RRM module 364 in the AP 350 illustrated in FIG. 5) modifies RRM input parameters. In an embodiment, the RRM module modifies the RRM input parameters based on the verified LOS estimate following block 404. For example, the RRM module can generate enhanced path-loss estimates to use for channel assignment, transmission power assignment, and roaming prioritization. This is discussed in more detail with regard to FIG. 6, below.

At block 408, the RRM module determines and applies RRM values using RRM input parameters (e.g., the parameters generated at block 406). In an embodiment, the RRM module uses the RRM input parameters generated using the LOS estimate (e.g., enhanced path-loss estimates, as discussed with regard to FIG. 6) to determine channel assignment, transmission power, roaming prioritization, and other suitable RRM values.

This can be done, for example, using known RRM computation algorithms and techniques (e.g., in existing APs). The known RRM algorithms and techniques will generate improved RRM values because of the improved RRM input parameters generated using LOS estimate information. The wireless STA (e.g., the AP) can then operate using the generated radio resource values (e.g., the generated channel values, transmission power values, and roaming values).

Alternatively, or in addition, the RRM computation algorithms and techniques themselves can be modified to incorporate LOS estimate information. For example, instead of modifying the input parameters for the RRM computation algorithms and techniques (e.g., as discussed below with regard to FIG. 5), the input parameters could remain unchanged and the RRM computation algorithms and techniques could be modified to consider LOS estimate information. Further, both the input parameters for the RRM computation algorithms and techniques, and the RRM computation algorithms and techniques, could be modified to use LOS estimate information.

Figure 6:
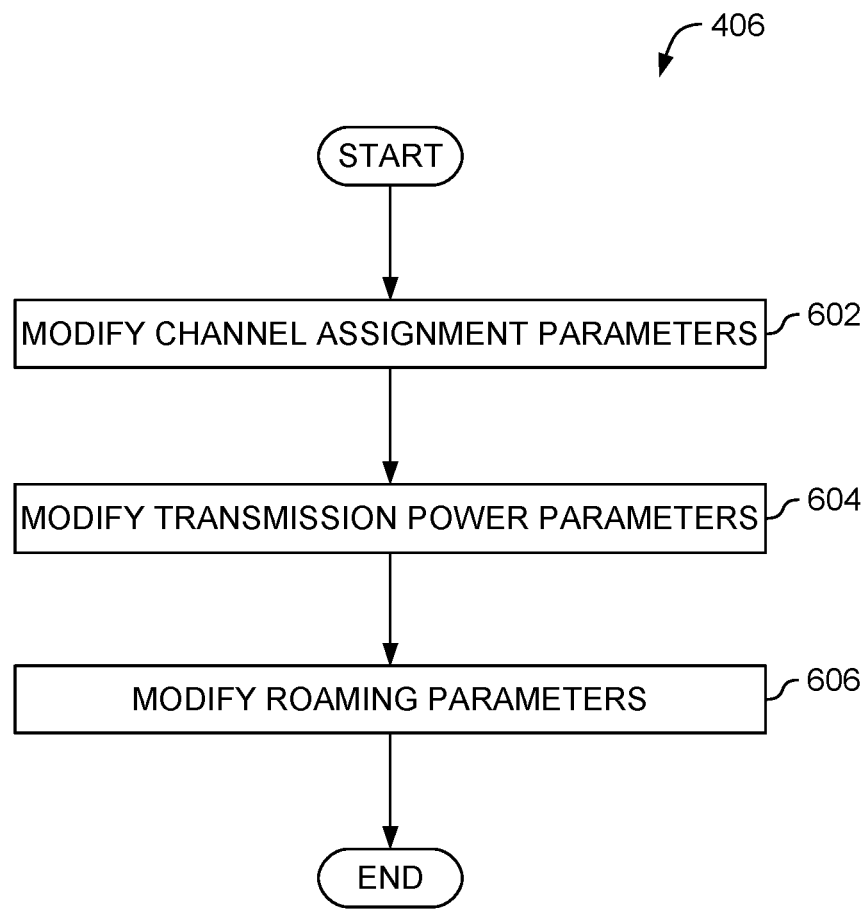
FIG. 6 is a flowchart further illustrating RRM using line of sight information, according to one embodiment.

FIG. 6 is a flowchart 600 further illustrating RRM using LOS information, according to one embodiment. In an embodiment, FIG. 6 corresponds with block 406 illustrated in FIG. 4. At block 602, an RRM module (e.g., the RRM module 364 in the AP 350 illustrated in FIG. 5) modifies channel assignment parameters based on the LOS estimate (e.g., the verified LOS estimate generated at block 404 in FIG. 4).

Many current channel assignment algorithms and techniques rely on path-loss measurements between APs for channel assignment. For example, a channelization algorithm may attempt to improve frequency separation among neighboring basic service sets (BSSs) (e.g., neighboring APs and user devices). This can be done by assigning a metric to each channel that is based on: (1) how many detected neighbors are also operating on that channel and (2) the RSSI at which these neighbors are detected. The RRM module then picks the channel that carries the smallest weight.

In an embodiment, an RRM module can use LOS estimate information to improve this channelization. For example, as discussed above and illustrated in FIG. 2, two pairs of STAs (e.g., two pairs of APs) may have the same RSSI but different coverage area overlap. As illustrated in FIG. 2, an AP 102A may have the same RSSI from the AP 102B and the AP 102H, but the AP 102B is closer in distance to the AP 102A and more likely to generate collisions with the AP 102A. This is because the AP 102B is not within LOS of the AP 102A while the AP 102H is within LOS of the AP 102A.

The RRM module at the AP 102A can receive an estimate that the AP 102B is within LOS of the AP 102A, and can incorporate this into the channelization algorithm. For example, the AP 102A can attempt more strongly to avoid collisions with the AP 102B, since there is a likelihood that the AP 102A and the AP 102B have a coverage overlap (e.g., even though the RSSI for the pair may be relatively low). In an embodiment, this can be done by modifying the path-loss algorithm used for channelization to incorporate LOS estimate information. For example, this can be done using the following equation:

$$PL\_Enhanced = PL\_Measured + (LOS\_Estimate - 0.5)$$
*Adjustment Coefficient

In an embodiment, PL_Enhanced represents the enhanced path-loss incorporating LOS estimate information, PL_Measured represents the measured path-loss (e.g., based on NDP frame transmission or any other suitable technique), and LOS_Estimate represents the LOS likelihood estimate information (e.g., as provided in the LOS likelihood element 500 illustrated in FIG. 5).

At block 604, the RRM module modifies transmission power parameters based on the LOS estimate information. For transmission power assignment, existing RRM algorithms and techniques can adjust an APs transmission power based on the RSSI of neighboring STAs (e.g., neighboring APs) in attempt to control cell sizes and reduce inter-BSS interference, while at the same time maintaining coverage in a deployed area. But as discussed above with regard to block 602, in an embodiment LOS information affects the likelihood of collision between neighboring STAs (e.g., between neighboring APs).

In an embodiment, the RRM module can improve transmission power assignment by incorporating LOS estimate information. For example, the path-loss estimate can be improved by using the same equation used for channelization:

$$PL\_Enhanced = PL\_Measured + (LOS\_Estimate - 0.5)$$
*Adjustment Coefficient

In an embodiment, PL_Enhanced represents the enhanced path-loss incorporating LOS estimate information, PL_Measured represents the measured path-loss (e.g., based on NDP frame transmission or any other suitable technique), and LOS_Estimate represents the LOS estimate information (e.g., as provided in the LOS likelihood element 500 illustrated in FIG. 5). Just as for channelization discussed with regard to block 602 above, the RRM module can use the enhanced path-loss information to determine appropriate transmission power parameters.

At block 606, the RRM module modifies roaming parameters based on LOS information. For example, an AP can use RRM to steer an STA (e.g., a user device) to a nearby AP. The AP can provide a list of candidate APs for the STA to consider. In an embodiment, the AP can further prioritize the candidate APs based on various criteria. This criteria can include RSSI of neighboring APs, ranging estimates (e.g., from FTM or other suitable techniques), and other suitable criteria.

In an embodiment, LOS estimate information between the originating AP and its neighboring APs can be used to improve roaming, including improving the prioritization of candidate APs for roaming. In an embodiment, neighboring APs with the same RSSI may be reverse-adjusted for the LOS to the originating AP. For example, a neighboring AP with a relatively lower RSSI and weak LOS may be a strong roaming candidate, assuming the LOS from the roaming candidate AP to the STA is stronger than the LOS from the current AP to the roaming candidate AP.

Further, ranging information between the STA and candidate APs can be used to improve roaming. For example, an AP may identify whether a roaming STA is likely stationary or moving by observing the ranging information, as well through other means If the STA is likely to be stationary, and the LOS estimate to the candidate AP is high (e.g., it is likely that the candidate AP is within LOS of the STA), that neighboring AP can be prioritized higher than it would have been without the LOS estimate.

If the STA is likely to be mobile, however, a candidate AP that currently has a high LOS estimate (e.g., the STA is likely currently within LOS of the candidate AP) can be prioritized lower than another candidate AP with similar RSSI to the STA but a lower LOS estimate (e.g., not currently within LOS). That is, if the STA is likely mobile, the currently connected AP can prioritize, for roaming, an AP that is not currently within LOS of the STA over another AP that has the same RSSI but is currently within LOS of the STA.

This is because, assuming the RSSI is approximately equal between the STA and the two candidate APs (one within LOS of the STA and the other not within LOS of the STA), the candidate AP without LOS is likely to be in closer physical proximity to the STA (i.e., as discussed above with regard to FIG. 2). Because LOS is likely to change as the STA moves (or other objects between the STA and the AP move), it is likely that the line of communication between the STA and the AP that is not currently within LOS will be safer than the line of communication between the STA and the AP that is currently within LOS. The longer physical distance between the currently-LOS-candidate-AP and the STA can be detrimental to link quality, while the closer distance of the not-currently-LOS-candidate AP means that communication is likely to stay strong after limited motion (e.g., the not-currently-LOS-candidate AP is already not within LOS of the STA—it is less likely to be impaired as the STA moves). Furthermore, because the LOS-candidate-AP is further from the STA, it is likely that there is another candidate AP that is nearer to the STA.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   determining, at a first wireless access point (AP), one or more radio resource management (RRM) input parameters, wherein the one or more RRM input parameters are determined based on a line of sight (LOS) estimate between two wireless stations (STAs), the two wireless STAs comprising the first AP and a second AP;
   generating a plurality of RRM values based on the one or more RRM input parameters, wherein the plurality of RRM values is generated to reduce radio transmission collisions between a first basic service set (BSS) corresponding to the first AP and a second BSS corresponding to the second AP, based on the LOS estimate; and
   establishing a wireless connection between the first AP and a first STA using the RRM values.

2. The method of claim 1, wherein the one or more RRM input parameters comprise an enhanced path-loss estimate relating to the two STAs.

3. The method of claim 2, wherein the enhanced path-loss estimate comprises a measured path-loss estimate modified based on the LOS estimate.

4. The method of claim 3, wherein the measured path-loss estimate is determined based on neighbor discovery protocol (NDP) frames exchanged between the first AP and the second AP.

5. The method of claim 1, further comprising:
   receiving the LOS estimate at the first AP as part of a network message comprising a LOS log likelihood ratio relating to the two STAs.

6. The method of claim 1, wherein the plurality of RRM values comprises at least one of a channel assignment between the first AP and the second AP or a transmission power assignment between the first AP and the second AP.

7. The method of claim 1, wherein the first STA comprises a first user device, the method further comprising:
   determining a first roaming priority for the first user device and the second AP based on a LOS estimate between the first user device and the second AP; and
   determining a second roaming priority for the first user device and a third AP based on a LOS estimate between the first user device and the third AP.

8. The method of claim 7, wherein the LOS estimate between the first user device and the second AP is greater than the LOS estimate between the first user device and the third AP, and wherein the first roaming priority is higher than the second roaming priority.

9. The method of claim 7, wherein the LOS estimate between the first user device and the second AP is greater than the LOS estimate between the first user device and the third AP, wherein the first user device is estimated to be mobile, and wherein the first roaming priority and the second roaming priority are reverse-adjusted based on the LOS estimates so that the second roaming priority is higher than the first roaming priority.

10. The method of claim 1, further comprising:
    comparing a measured first path loss corresponding to the two STAs with an estimated second path loss associated with a LOS path loss model; and
    modifying, based on the comparison of the first path loss and the second path loss, a trust level associated with the LOS estimate, wherein the RRM input parameters are determined based, at least in part, on the modified trust level.

11. A first wireless access point (AP), comprising:
    a processor; and
    a memory storing a program, which, when executed on the processor, performs an operation, the operation comprising:
    determining, at the AP, one or more radio resource management (RRM) input parameters, wherein the one or more RRM input parameters are determined based on a line of sight (LOS) estimate between two wireless stations (STAs);
    generating a plurality of RRM values based on the one or more RRM input parameters;
    establishing a wireless connection between the AP and a first STA using the RRM values, wherein the first STA comprises a first user device,
    determining a first roaming priority for the first user device and a second AP based on a LOS estimate between the first user device and the second AP; and
    determining a second roaming priority for the first user device and a third AP based on a LOS estimate between the first user device and the third AP.

12. The AP of claim 11, wherein the one or more RRM input parameters comprise an enhanced path-loss estimate relating to the two STAs.

13. The AP of claim 12, wherein the enhanced path-loss estimate comprises a measured path-loss estimate modified based on the LOS estimate, wherein the two STAs comprise the first AP and a second AP, and wherein the measured path-loss estimate is determined based on neighbor discovery protocol (NDP) frames exchanged between the first AP and the second AP.

14. The AP of claim 11, wherein the two STAs comprise the first AP and a second AP, and wherein the plurality of RRM values is generated to reduce radio transmission collisions between a first basic service set (BSS) corresponding to the first AP and a second BSS corresponding to the second AP, based on the LOS estimate.

15. The AP of claim 11,
    wherein the LOS estimate between the first user device and the second AP is greater than the LOS estimate between the first user device and the third AP, wherein the first user device is estimated to be mobile, and wherein the first roaming priority and the second roaming priority are reverse-adjusted based on the LOS estimates so that the second roaming priority is higher than the first roaming priority.

16. A non-transitory computer program product comprising:
    a non-transitory computer-readable storage medium having computer-readable program code embodied therewith, the computer-readable program code executable by one or more computer processors to perform an operation, the operation comprising:
    determining, at a first wireless access point (AP), one or more radio resource management (RRM) input parameters, wherein the one or more RRM input parameters are determined based on a line of sight (LOS) estimate between two wireless stations (STAs);
    comparing a measured first path loss corresponding to the two STAs with an estimated second path loss associated with a LOS path loss model;
    modifying, based on the comparison of the first path loss and the second path loss, a trust level associated with the LOS estimate, wherein the RRM input parameters are determined based, at least in part, on the modified trust level;

generating a plurality of RRM values based on the one or more RRM input parameters; and establishing a wireless connection between the first AP and a first STA using the RRM values.

17. The computer program product of claim 16, wherein the one or more RRM input parameters comprise an enhanced path-loss estimate relating to the two STAs.

18. The computer program product of claim 16, wherein the two STAs comprise the first AP and a second AP, and wherein the plurality of RRM values is generated to reduce radio transmission collisions between a first basic service set (BSS) corresponding to the first AP and a second BSS corresponding to the second AP, based on the LOS estimate.

19. The computer program product of claim 16, wherein the first STA comprises a first user device, the operation further comprising:

determining a first roaming priority for the first user device and a second AP based on a LOS estimate between the first user device and the second AP; and determining a second roaming priority for the first user device and a third AP based on a LOS estimate between the first user device and the third AP, wherein the LOS estimate between the first user device and the second AP is greater than the LOS estimate between the first user device and the third AP, wherein the first user device is estimated to be mobile, and wherein the first roaming priority and the second roaming priority are reverse-adjusted based on the LOS estimates so that the second roaming priority is higher than the first roaming priority.

* * * * *